United States Patent [19]

Mischo

[11] 4,056,319
[45] Nov. 1, 1977

[54] MICROFILM RECORDING APPARATUS
[75] Inventor: Klaus Mischo, Munich, Germany
[73] Assignee: AGFA-Gevaert, A.G., Leverkusen, Germany
[21] Appl. No.: 617,446
[22] Filed: Sept. 29, 1975
[30] Foreign Application Priority Data
  Sept. 27, 1974  Germany .............................. 2446240
[51] Int. Cl.$^2$ ...................... G03B 27/74; G03B 27/78
[52] U.S. Cl. ......................................... 355/68; 355/71
[58] Field of Search ........................ 355/67, 68, 69, 71
[56] References Cited
  U.S. PATENT DOCUMENTS
  3,778,154  12/1973  Dennhardt et al. ................... 355/68

Primary Examiner—John Gonzales
Attorney, Agent, or Firm—Michael J. Striker

[57] ABSTRACT

The originals to be photographed are transported past a measuring station and an aperture at a filming station. The microfilm is transported past a film aperture at the filming station. The originals vary in length (measured in the direction of transport) from a maximum to a minimum length. The measuring station is spaced a distance from the filming station which corresponds to the maximum length. Each original is scanned in a direction perpendicular to the direction of transport at the measuring station and the peak amount of light reflected from the original is stored. The number of storage units is equal to the number of originals of smallest length which can be accommodated in the distance between the filming and measuring stations. For each storage unit, a monostable multivibrator is furnished which is started when the corresponding original leaves the measuring station and whose time constant is such that its trailing edge occurs just prior to the time the same original reaches the filming station. A step switch controlled by the trailing edges of the multivibrators connects the output of each storage unit in turn to the input of a differential amplifier whose output in turn controls the position of a filter or diaphragm controlling the light falling on the original at the filming station.

16 Claims, 4 Drawing Figures

MICROFILM RECORDING APPARATUS

BACKGROUND OF THE INVENTION

This invention relates to a microfilm recording arrangement wherein the originals are transported past an aperture at a filming station and wherein the illumination of the microfilm takes place through a filming aperture in the form of a slit.

SUMMARY OF THE INVENTION

It is an object of the present invention to furnish a microfilm arrangement of the above-described type in which a good measurement of the reflection of light from the complete original and a corresponding exact adjustment of the exposure, that is of the slit illumination at the filming station can take place regardless of the density distribution in the original. Further, the stripes created on the film in known microfilming arrangements by the variation of exposure of different portions of the original are to be avoided. It is thus the object of the present invention to furnish a microfilm arrangement wherein the filming takes place with a uniform correct exposure for each original.

The present invention is an arrangement for making copies of a sequence of originals having a length which varies between a maximum length and a minimum length. It comprises first transport means for transporting said sequence of originals in the direction of said length along a predetermined path past a filming station and a measuring station spaced from said filming station by a predetermined distance along said path corresponding to said maximum length. Further, scanning means are provided for scanning said original in a direction perpendicular to the direction of transport and furnishing scanning signals corresponding to the quantity of light reflected by said original. It further comprises storage means connected to said scanning means for furnishing a stored scanning signal having a predetermined relationship to said scanning signal. Exposure control means are positioned at said filming station for addressing said storage means just prior to the time the original arrives at said filming station and adjusting the exposure of said original in accordance with said stored scanning signal. Finally, reset means are provided for resetting said storage means after said original leaves said filming station.

In a preferred embodiment of the present invention the stored signal corresponds to the peak value of the scanning signals generated by scanning the corresponding original.

In a preferred embodiment of the present invention, the storage means comprise a plurality of storage units equal in number to the number of originals of shortest length which can be accommodated in the distance between the measuring station and the filming station.

In a preferred embodiment of the present invention, the scanning means comprise a plurality of photoelectric transducer means positioned side-by-side in a direction perpendicular to the direction of transport of the original. A ring counter is furnished which causes each of the transducer means to be connected in turn to the input of an amplifier at a frequency such that the time required for scanning a line is substantially less than the time required for transporting an original past the measuring station.

In a further preferred embodiment of the present invention, the output of the above-mentioned amplifier is connected to each storage unit in turn by means of a storage selector. The storage selector means comprise a threshold circuit which responds to the transition from an exposed original to an edge and furnishes a threshold signal advancing the storage selector means in response to each such transition. Further, each threshold signal also starts a time-delay circuit which, after the time required for the original to travel from the measuring to the filming station furnishes an output pulse which controls storage addressing means. The storage addressing means are switched from storage to storage in synchronism with the storage selector means, but with a time delay corresponding to the above-mentioned travelling time from the measuring to the filming station. The so-addressed storage then furnishes a signal corresponding to the desired position of a diaphragm or filter. This signal is applied to a differential amplifier which compares it with the actual position of the diaphragm or filter and furnishes an output signal controlling a motor adjusting the diaphragm or filter position until the actual position is equal to the desired position as signified by the stored scanning signal. The correct automatic exposure of originals of different lengths is thus achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1a shows another version of the measuring arrangement;

Description of the Preferred Embodiments

Figure 1:
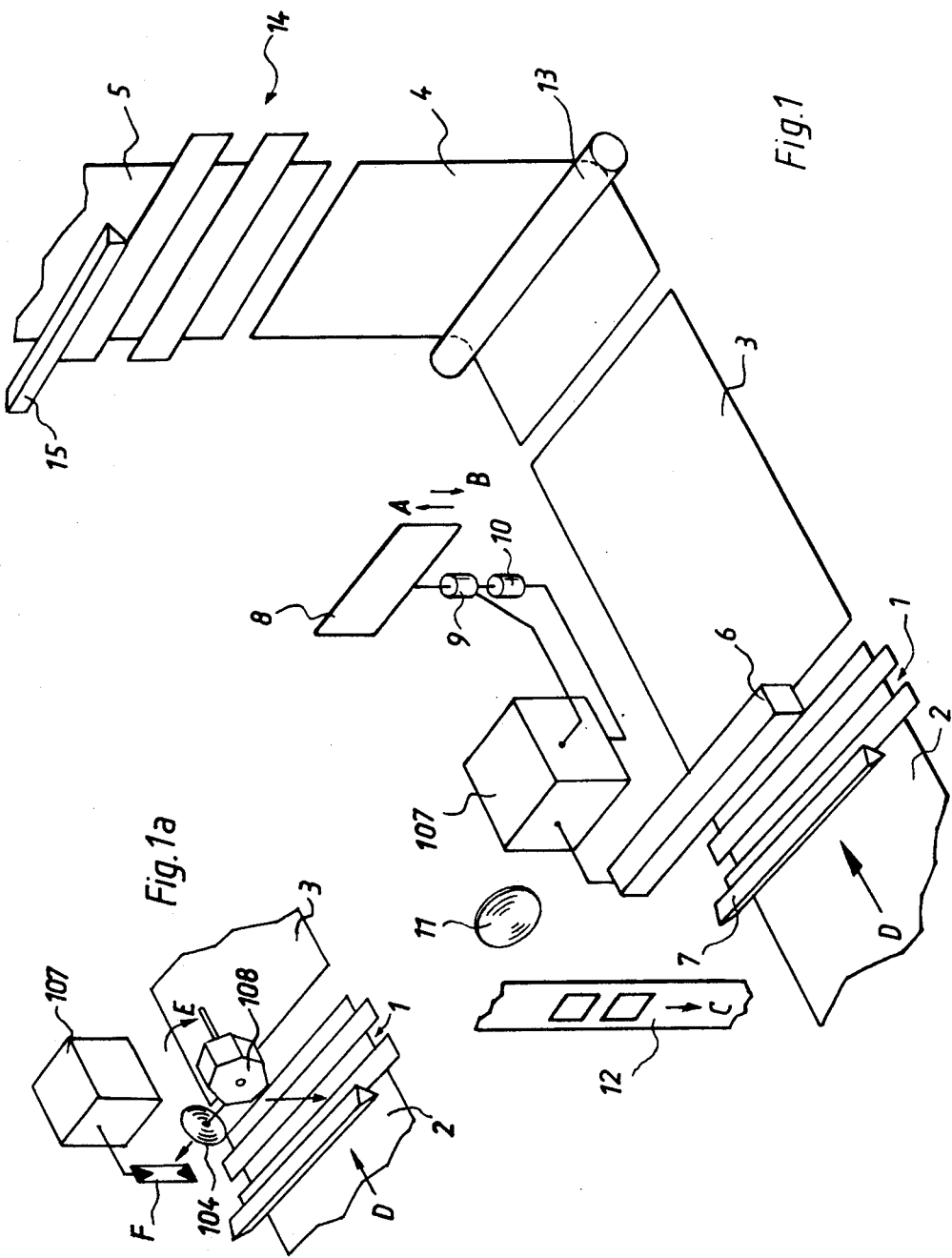
FIG. 1 shows a schematic overall diagram of a first embodiment of the present invention.

A preferred embodiment of the present invention will now be described with reference to the drawing.

In FIG. 1, reference numeral 1 denotes a slit-like aperture at the measuring station for originals numbered 2, 3, 4 and 5. Above aperture 1 is the measuring arrangement 6 as well as an exposure control arrangement 107. The exposure control arrangement 107 includes storage units and has electrical connections to the measuring arrangement 6. Reference numeral 8 denotes a diaphragm or a filter which can be moved in the direction of an arrow A or an arrow B by means of a drive mechanism 9. The signals for controlling the drive mechanism 9 are derived from the exposure control circuit 107. Further, a means for furnishing an actual position signal 10, furnishes a signal to the exposure control arrangement 107 which denotes the actual position of the diaphragm or the filter at that time.

An objective lens is denoted by reference numeral 11, while the microfilm has the reference numeral 12. The microfilm is moved in direction of the arrow C. The originals are transported in the direction of an arrow D, the direction of transport being changed from a horizontal to a vertical direction between the measuring and the filming station by means of a roller 13. Further, illuminating means 15 are present at the filming station.

Figure 2:
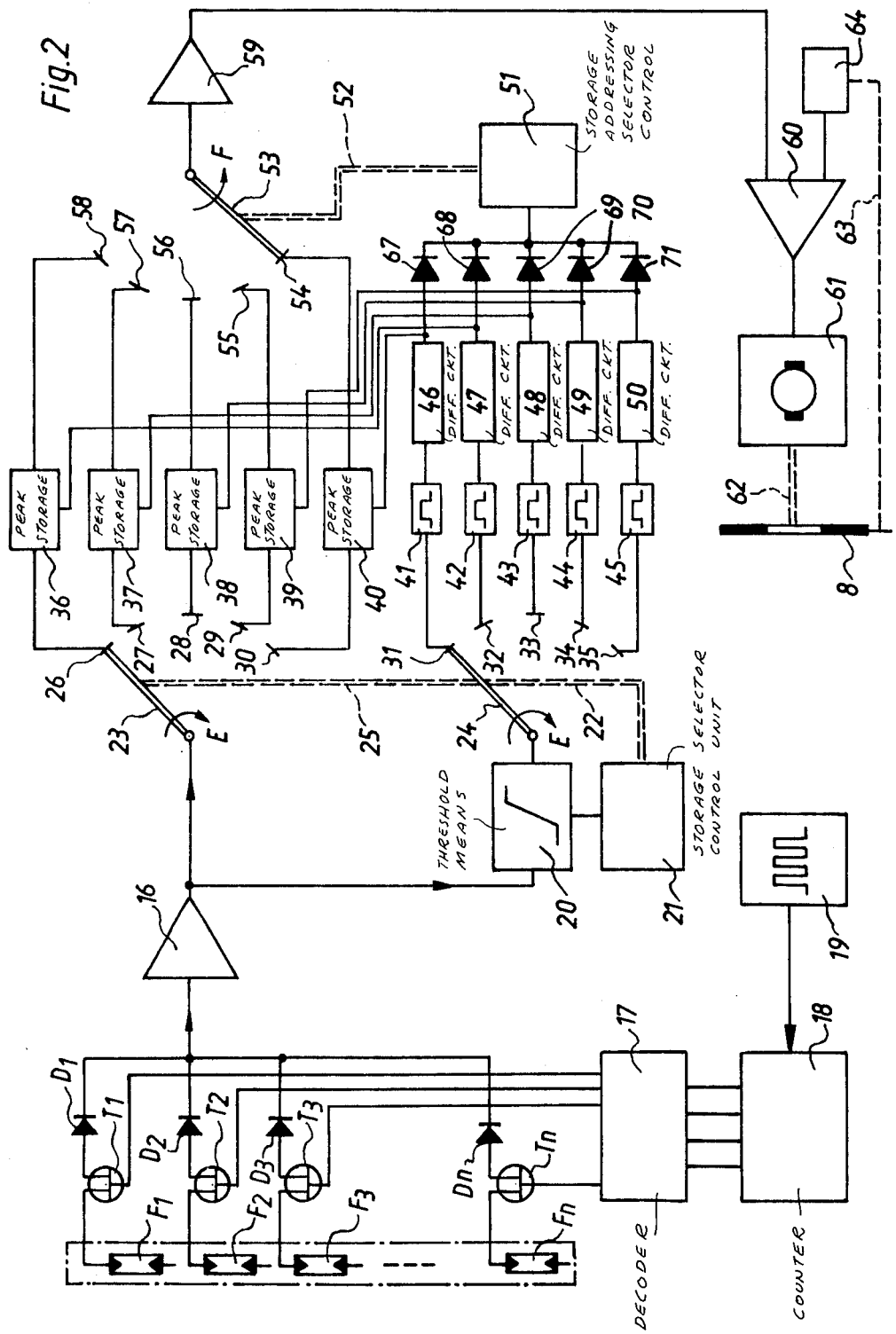
FIG. 2 shows the measuring and exposure control circuits of FIG. 1 in greater detail.

The measuring arrangement 6 is shown in greater detail in FIG. 2. It comprises, as shown in FIG. 2, photoelectric transducers F1, F2, F3 ... Fn. These are arranged along the whole width of the aperture at the measuring station, that is in a direction perpendicular to the direction of transport of the original. The photoelectric transducers which, in a preferred embodiment of the present invention are photoresistors, are connected in series with controllable semiconductor switches T1, T2, T3 ... Tn. In a preferred embodiment of the present invention these are field-effect transistors. Diodes D1, D2, D3 ... Dn each have one side connected to a corresponding one of the controlled semiconductor switches. The other sides of the diodes are connected in common to the input of an amplifier 16. The control electrodes of the controlled switches are connected to the output of a decoder 17 whose input lines are energized by a counter 18. Counter 18 in turn counts the number of pulses furnished by a pulse generator 19. Counter 18, in a preferred embodiment of the present invention, is a binary coded decimal counter whose output is furnished, as indicated, on four output lines. The frequency of pulse generator 19 is such that the time required for connecting all of the photoelectric transducers in turn to the input of amplifier 16 is substantially smaller than the time required for an original to be transported past the measuring station. The output of decoder 17, in response to the counting signals furnished by counter 18, then causes each of the controlled semiconductor switches T1, etc. to be switched to the conductive state in sequence and to remain in the conductive state for a very short time interval as determined by the pulse width of the pulses furnished by pulse generator 19. The number of photoelectric transducer elements of course is so chosen that optimally small measuring surfaces per line result.

A threshold stage 20 is connected to the output of amplifier 16. When an original leaves the measuring station, the transition from "light" to "dark" results in a signal at the output of amplifier 16 which exceeds the threshold value of the threshold circuit 20. Threshold circuit 20 then furnishes a pulse which is applied to storage selector means including a unit 21 which, in a preferred embodiment of the present invention, comprises a motor for driving selector arms 23 and 24 which are mechanically coupled to each other by a coupling 25. Seelector arm 23 controls five positions, that is, the output of amplifier 16 can be connected to one of terminals 26, 27, 28, 29 or 30 which, respectively, constitute the input to storage means 36, 37, 38, 39 and 40. Similarly, selector arm 24 connects the output of the threshold means 20 in turn to terminals 31, 32, 33, 34 and 35. Terminals 31-35 are respectively connected to the inputs of monostable multivibrators 41, 42, 43, 44 and 45 which form part of the time delay means. The time that each of the monostable multivibrators 41-45 is in the unstable state wherein it furnishes an output pulse, is substantially equal to the time which an original requires to travel from the measuring station to the filming station. Threshold means 20 also furnishes a threshold output signal when the transition from "dark" to "light" occurs, that is when an original enters the measuring station. It is this signal which starts that one of the monostable multivibrators which is connected to the output of threshold circuit 20, by means of selector arm 24. The trailing edge of the respective monostable multivibrator is timed to occur just prior to the time that the original enters the filming station. Differentiating circuits 46, 47, 48, 49 and 50 are respectively connected to the output of monostable multivibrators 41, 42, 43, 44 and 45. Each of the differentiator circuits contains a capacitor and a resistor connected in series as well as a diode connected in parallel with the resistor for shunting the pulse created by differentiation of the leading edge of the pulse furnished by the respective multivibrator to ground potential. The output of the differentiator circuits is thus a pulse occurring at the time of the trailing edge of the respective one of the multivibrators. The pulse at the output of unit 46 is applied to the clear input of storage 40; the pulse appearing at the output of unit 47 to the clear input of unit 36; the pulse at the output of unit 48 to the clear input of unit 47, etc. Thus the signal which signifies that a new original has entered the filming station also causes the clearing of the storage of the last previous original.

Each of decoupling diodes 67-71 has an anode connected to the output of a corresponding one of the differentiator stages 46-50. The cathodes of diodes 67-71 are connected in common and to the input of storage address means including a motor 51. Other address control means than a motor may also be used as, for example, a type of counter-decoder-switch arrangement used in the scanning process. (Units 19, 18, 17, T1 ... Tn. ) As shown, motor 51 is connected by a mechanical coupling 52 to a selector arm 53 which is a five-position selector arm. Selector arm 53 serves to connect terminals 58, 57, 56, 55 and 54 to the input of an inverting amplifier 59. Terminals 58-54 are connected, respectively, to the outputs of storages 36-40. In a preferred embodiment of the present invention storages 36-40 are peak storages.

The output of inverting amplifier 59 is connected to one input of a differential amplifier 60. The differential amplifier is an operational amplifier. The output of differential amplifier 60 is connected to a drive means 61 (corresponding to the unit 9 in FIG. 1) which controls a diaphragm 8. The actual position of diaphragm 8 is converted into an electrical signal by a converter 64. Converter 64 may, for example, comprise a potentiometer whose wiper arm is coupled to the diaphragm, the voltage at the wiper arm constituting the actual position signal. The potentiometer is of course connected to a source of voltage.

During scanning of a line of the original then in measuring station 1, the photoelectric transducer means F1-Fn are connected in sequence to the input of amplifier 16 at a frequency determined by the frequency of pulse generator 19.

As shown in FIG. 2, the selector arm 23 is connected to the first peak storage 36, the selector arm 24 to the first monostable multivibrator 41, while the address selector arm 53 is connected with the fifth storage 40. In synchronism with the passing of each original through the measuring station, the arms 23 and 24 are moved from the indicated initial position step-by-step in the direction of the arrow E. The operation of the address selector arm 53 is carried out in synchronism with the movement of arms 23 and 24, but at a time delayed relative to the operation of arms 23 and 24 by the time required for the original to travel from the measuring station to the filming station.

For the position of selector arms 23 and 24 shown in FIG. 2, the peak value of light reflected from the associated original is stored in the peak storage 36. When this original entered measuring station 1, a start pulse was applied to monostable multivibrator 41. When the original leaves the measuring station, a pulse is applied to unit 21 causing selector arms 23 and 24 to be moved to the next position. Arm 23 will thus be connected to storage unit 37. The peak value of light reflected by the next original will now be stored in unit 37. Simultaneously with the entering of the next original into measuring station 1, monostable multivibrator 42 was switched to the unstable state. When this second original now leaves measuring station 1, the selector arms 23 and 24 are again moved, so that the storage signal stored in unit 38 corresponds to the peak value of light reflected by the third original to enter the measuring station. Also of course monostable multivibrator 43 will switch to the unstable state. As soon as the first original arrives at a position just prior to the first aperture, namely the aperture at the filming station, monostable multivibrator 41 returns to its stable state causing a pulse to be furnished by differentiator 46. Motor 51 receives a pulse causing selector arm 53 to be moved to position 58. The stored scanning signal in storage unit 36 is thus applied through inverting amplifier 59 to differential amplifier 60 where it serves as a desired position signal and is compared to the actual position signal furnished by unit 64. The signal corresponding to the difference of the signals applied at the two inputs of the differential amplifier serves to control motor 61 which in turn regulates diaphragm 8 until the signal at the two inputs of differential amplifier 60 are equal. At this point the actual diaphragm or filter position corresponds to the desired diaphragm or filter position as signified by the signal stored in unit 36.

In response to the signal furnished by differentiator unit 47, that is when monostable multivibrator 42 returns to the stable state, storage 36 is cleared. It might be noted here that the time interval between the trailing edge generated by monostable multivibrator 42 and the trailing edge generated by monostable multivibrator 41 is equal to the time interval between pulses applied to unit 21, that is to the time interval required for each step of the switching of arms 23 and 24.

When the first original arrives at the filming station including aperture 14, the diaphragm 8 has already been adjusted to the correct value. Thus a correct exposure for the original results.

Figure 3:
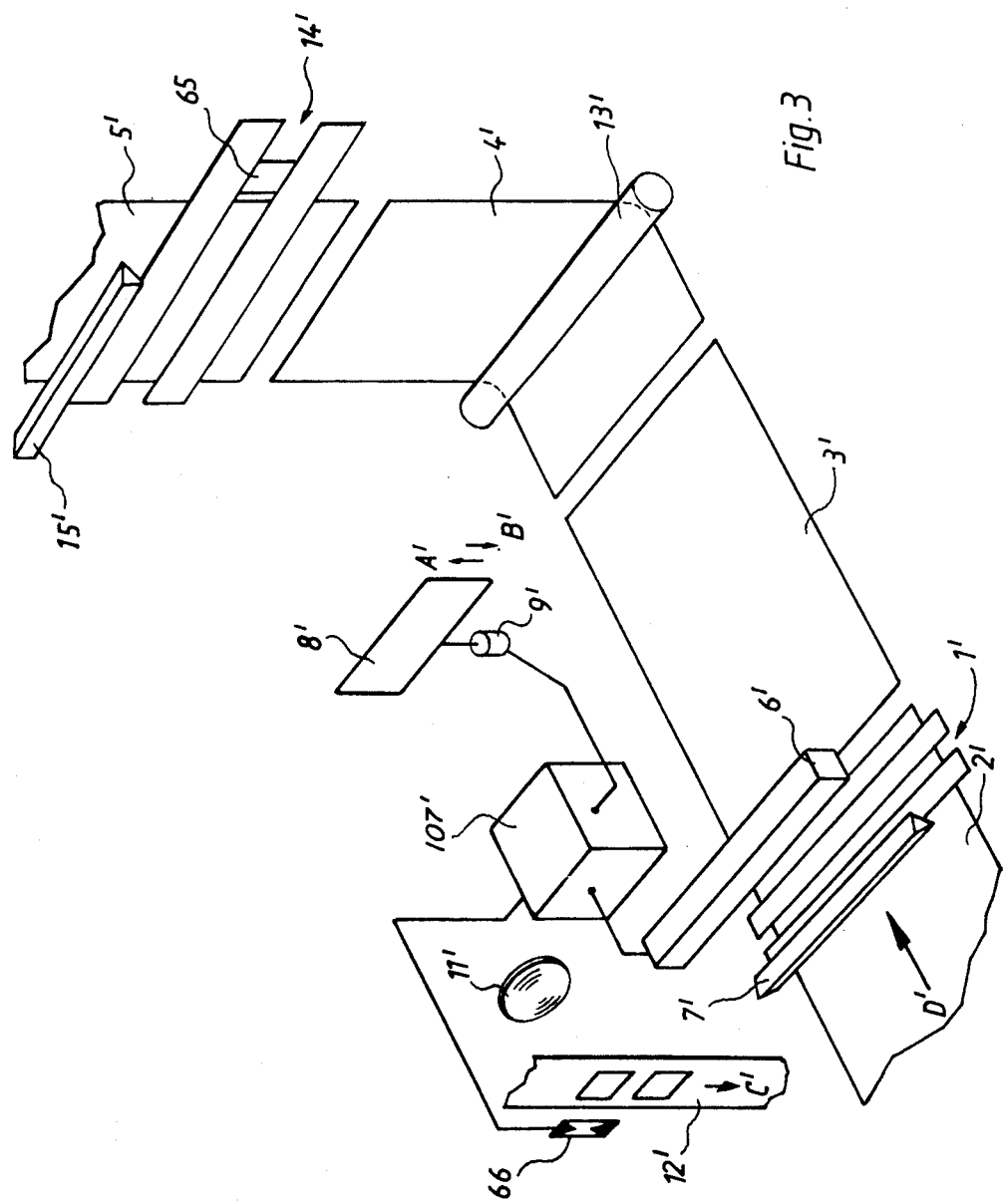
FIG. 3 shows an alternate embodiment of the present invention.

In FIG. 3, the elements which are the same as those in FIG. 1 are designated by the same reference numerals. FIG. 3 differs from FIG. 1 only in that a reference reflecting circuit 65 is provided in the vicinity of aperture 14. Further, a photoelectric transducer 66 is mounted near microfilm 12 to measure the light reflected by surface 65 and to furnish a corresponding signal to the exposure control means 107'. The light reflected by surface 65, since this surface is also positioned behind the diaphragm 8' corresponds to the position of the diaphragm 8'. The signal furnished by photoelectric transducer 66 is thus an actual position signal where the actual position refers to the actual position of diaphragm 8'.

FIG. 1a depicts a modified version of the measuring arrangement 6 of FIG. 1. Here, scanning is effected using a single photoelectric transducer R cooperating with a scanning mirror means 108 which rotates about an axis E parallel to the transport direction D of the originals, as well as a lens 104.

While the invention has been illustrated and described as embodied in scanning and exposure control means, it is not intended to be limited to the details shown, since various modifications and circuit changes can be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Arrangement for making copies on microfilm of a sequence of originals having lengths varying between a maximum and a minimum length comprising, in combination, first transport means transporting said sequence of originals along a predetermined path in the direction of said length, past a measuring station and a filming station provided with exposure control means spaced from said measuring station by a predetermined distance along said path corresponding to said maximum length; scanning means for illuminating said original, scanning said original along successive scan lines extending transverse to the transport direction of said original and effecting the scanning along each such scan line progressively along the length of the scan line, and furnishing scanning signals corresponding to the quantity of light reflected by the so-scanned original; storage means connected to said scanning means, for furnishing a stored scanning signal having a predetermined relationship to said scanning signals; exposure control means at said filming station for addressing said storage means just prior to the time said original reaches said filming station and atjusting said exposure control means in dependence upon said stored scanning signal; and reset means for resetting said storage means after said original has passed through said filming station.

2. Arrangement as set forth in claim 1, wherein said stored scanning signal corresponds to the scanning signal signifying the peak quantity of light reflected by said original.

3. Arrangement as set forth in claim 2, wherein said scanning means comprises a plurality of photoelectric transducer means arranged side-by-side in the direction perpendicular to said direction of transport of said originals, an amplifier, and ring counter means for connecting said photoelectric transducer means in sequence to the input of said amplifier at a scanning speed substantially exceeding the velocity of transport of said originals.

4. Arrangement as set forth in claim 1, wherein said scanning means comprise a single photoelectric transducer and mirror means adapted to rotate about an axis parallel to said direction of transport of said originals for reflecting light reflected by said original onto said photoelectric transducer.

5. Arrangement as set forth in claim 1, wherein said exposure control means comprise a diaphragm, means for adjusting the position of said diaphragm in accordance with a diaphragm control signal, and means for furnishing said diaphragm control signal as a function of the difference between the desired position of said diaphragm as signified by said stored scanning signal and the actual position of said diaphragm.

6. Arrangement as set forth in claim 5, wherein said means for furnishing said diaphragm control signal comprise a differential amplifier having a first input for receiving said stored scanning signal and a second input, and means for applying an actual position signal corresponding to the actual position of said diaphragm to said second input.

7. Arrangement as set forth in claim 6, wherein said transport means comprise first transport means for transporting said original passed a first aperture at said filming station; further comprising second transport means for transporting said microfilm passed a film aperture at said filming station; and wherein said means for furnishing an actual position signal comprise a reference reflecting surface mounted near said first aperture, a photoelectric transducer for receiving light reflected by said reference reflecting surface mounted near said film aperture, for furnishing said actual position signal as a function of the light reflected by said reference reflecting surface, and means for connecting said photoelectric transducer to said second input of said differential amplifier.

8. Arrangement for making copies on microfilm of a sequence of originals having lengths varying between a maximum and a minimum length comprising, in combination, first transport means transporting said sequence of originals along a predetermined path in the direction of said length, past a measuring station and a filming station provided with exposure control means spaced from said measuring station by a predetermined distance along said path corresponding to said maximum length; scanning means for illuminating said original, scanning said original in the direction substantially perpendicular to the direction of transport of said original, and furnishing scanning signals corresponding to the quantity of light reflected by the so-scanned original; storage means connected to said scanning means, for furnishing a stored scanning signal having a predetermined relationship to said scanning signals; exposure control means at said filming station for addressing said storage means just prior to the time said original reaches said filming station and adjusting said exposure control means in dependence upon said stored scanning signal; and reset means for resetting said storage means after said original has passed through said filming station, wherein said stored scanning signal corresponds to the scanning signal signifying the peak quantity of light reflected by said original, wherein said scanning means comprises a plurality of photoelectric transducer means arranged side-by-side in said direction perpendicular to said direction of transport of said originals, an amplifier, and ring counter means for connecting said photoelectric transducer means in sequence to the input of said amplifier at a scanning speed substantially exceeding the velocity of transport of said originals.

9. Arrangement as set forth in claim 8, wherein said predetermined distance along said path can accommodate a predetermined number of originals having said minimum length; and wherein said storage means comprises a plurality of storage units each furnishing a stored scanning signal corresponding to the largest quantity of light reflected by a corresponding one of said originals.

10. Arrangement as set forth in claim 9, further comprising storage selector means for connecting the output of said amplifier in turn to each of said storage units in synchronism with said transport of said originals and at a frequency varying as a function of the length of the scanned original and the velocity of transport of said original.

11. Arrangement as set forth in claim 10, wherein said storage selector means comprise threshold means connected to the output of said amplifier for furnishing a threshold output signal in response to each signal at the output of said amplifier indicative of a transition between an exposed portion of an original and an edge of said original, and step switch means connected to said threshold means for connecting said output of said amplifier in turn to each of said storage units under control of said threshold output signals.

12. Arrangement as set forth in claim 11, wherein said exposure control means comprise storage addressing means for addressing each of said storage units in turn under control of timing signals, and a plurality of time delay means interconnected between said threshold means and said storage addressing means, each for furnishing a timing signal to said storage addressing means in response to one of said threshold signals and after a time delay corresponding to the time required for an original to be transported from said measuring station to said filming station.

13. Arrangement as set forth in claim 12, wherein each of said time delay means comprise pulse furnishing means, each for furnishing a pulse in response to a threshold signal, each of said pulses having a trailing edge occurring just prior to the time the corresponding one of said originals reaches said filming station, and a plurality of differentiator means, each connected to one of said pulse furnishing means, each for furnishing one of said timing signals in response to the trailing edge of said pulse furnished by said pulse furnishing means.

14. Arrangement as set forth in claim 13, wherein each of said pulse furnishing means is a monostable multivibrator.

15. Arrangement as set forth in claim 13, wherein each of said storage units has a reset input for resetting said storage unit; further comprising means for connecting the output of each of said differentiator means to the reset input of the storage unit corresponding to the original preceding the original associated with the timing signal furnished by said differentiator means at said filming station, whereby said storage unit associated with an original leaving said filming station is reset when the next following one of said originals reaches said filming station.

16. Arrangement for making copies on microfilm of a sequence of originals having lengths varying between a maximum and a minimum length comprising, in combination, first transport means transporting said sequence of originals along a predetermined path in the direction of said length, past a measuring station and a filming station provided with exposure control means spaced from said measuring station by a predetermined distance along said path corresponding to said maximum length; scanning means for illuminating said original, scanning said original in the direction substantially perpendicular to the direction of transport of said original, and furnishing scanning signals corresponding to the quantity of light reflected by the so-scanned original; storage means connected to said scanning means, for furnishing a stored scanning signal having a predetermined relationship to said scanning signals; exposure control means at said filming station for addressing said storage means just prior to the time said original reaches said filming station and adjusting said exposure control means in dependence upon said stored scanning signal; and reset means for resetting said storage means after said original has passed through said filming station, wherein said exposure control means comprise a diaphragm, means for adjusting the position of said diaphragm in accordance with a diaphragm control signal, and means for furnishing said diaphragm control signal as a function of the difference between the desired position of said diaphragm as signified by said stored scanning signal and the actual position of said diaphragm.

* * * * *